(12) United States Patent
Hamada et al.

(10) Patent No.: US 8,754,849 B2
(45) Date of Patent: Jun. 17, 2014

(54) INFORMATION INPUT DEVICE AND INFORMATION INPUT METHOD

(75) Inventors: Koji Hamada, Nisshin (JP); Isao Aichi, Toyota (JP)

(73) Assignee: Denso Corporation, Kariya (JP)

( * ) Notice: Subject to any disclaimer, the term of this patent is extended or adjusted under 35 U.S.C. 154(b) by 198 days.

(21) Appl. No.: 13/305,974

(22) Filed: Nov. 29, 2011

(65) Prior Publication Data

US 2012/0146892 A1 Jun. 14, 2012

(30) Foreign Application Priority Data

Dec. 8, 2010 (JP) ................................. 2010-273850

(51) Int. Cl.
*G06F 3/01* (2006.01)
(52) U.S. Cl.
USPC ........................... 345/156; 345/157; 345/169
(58) Field of Classification Search
CPC .................................... G06F 3/01; G06F 3/014
USPC ......................................... 345/156, 157, 169
See application file for complete search history.

(56) References Cited

U.S. PATENT DOCUMENTS

| 2004/0243342 | A1 | 12/2004 | Rekimoto |
| 2010/0219989 | A1* | 9/2010 | Asami et al. ..................... 341/20 |
| 2010/0220054 | A1* | 9/2010 | Noda et al. ..................... 345/156 |

FOREIGN PATENT DOCUMENTS

| JP | A-2004-078966 | 3/2004 |
| JP | A-2008-276664 | 11/2008 |
| JP | A-2010-255131 | 10/2010 |

OTHER PUBLICATIONS

Office Action mailed Oct. 16, 2012 in corresponding JP Application No. 2010-273850 (and English translation).

\* cited by examiner

*Primary Examiner* — Joseph Feild
*Assistant Examiner* — Andrew Sasinowski
(74) *Attorney, Agent, or Firm* — Posz Law Group, PLC

(57) ABSTRACT

An information input device includes: an applying element having a ring shape so that an finger of a user is inserted into the applying element; a receiving element having a ring shape so that an finger of a user is inserted into the receiving element and disposed adjacent to the applying element in an extending direction of a center line of the applying element; a signal generating element generating and transmitting a waveform signal to the apply element so that the applying element outputs a measurement signal; and a signal extracting element extracting a signal relating to a posture of the finger from a reception signal, which is output from the receiving element based on the measurement signal received by the receiving element.

8 Claims, 8 Drawing Sheets

INFORMATION INPUT DEVICE AND INFORMATION INPUT METHOD

CROSS REFERENCE TO RELATED APPLICATION

This application is based on Japanese Patent Application No. 2010-273850 filed on Dec. 8, 2010, the disclosure of which is incorporated herein by reference.

TECHNICAL FIELD

The present invention relates to an information input device and an information input method.

BACKGROUND

In general, in a general-purpose computer system such as a work station and a personal computer, a specific-purpose computer system such as a vehicle navigation device, a micro computer suitably used for an audio system and an air conditioner, operation information with respect to all of information processing devices is input with using information input elements such as a key board, a mouse and a button.

Recently, the operation information is input by gestures, i.e., movement of a body of a user. For example, a method for inputting the operation information with using a finger movement, which provides a wide variety of motions, is described in JP-A-2008-276664 and JP-A-2002-358149 corresponding to US 2004/0243342.

JP-A-2008-276664 teaches a technique that a Piezo electric sensor with a cable shape having flexibility is attached to a finger of a user so that the sensor detects a bending motion and a stretching motion of the finger. Then, the detection result is used for operation information.

JP-A-2002-358149 teaches an information input device formed to be a wristwatch type device so that the information input device is worn on a wrist of the user. With using a transmission electrode and a reception electrode alternately arranged around the wrist in a circumferential direction, a motion of an arm and a hand (i.e., an upper extremity) of the user is detected. Specifically, an electro-static coupling generated between a transmission electrode and an adjacent reception electrode is changed with a gap between these electrodes and the wrist. When the user moves the arm and/or hand, the shape of the arm and/or hand is slightly changed according to the movement of the arm and/or hand. Thus, the gap between the electrodes and the wrist is changed, so that the electro-static coupling value is changed. When the change of the electro-static coupling value is detected, the movement of the hand and arm is detected.

Thus, the motion of the upper extremity, i.e., the gesture is detected. A specific gesture such as grasping movement of the hand and opening movement of the hand connects with the operation information as an input command, which is to be input into the information processing device. The relationship between the gesture and the input command is stored, so that the operation information is input into the information processing device according to the gesture.

However, the detection method with using the Piezo sensor having flexibility and attached along with the finger requires to wear the sensor on the finger. Thus, similar to a data globe, a step for wearing the sensor on the finger is bothersome. When the attachment of the sensor is bothersome, the user feels physical strain such that the user wears the Piezo sensor on the finger, and mental strain such that the user has to attach and detach the sensor on the finger.

The information input device described in JP-A-2002-358149 detects the motion of the upper extremity based on the change of the shape of the upper extremity. Thus, the device can detect the gesture, which provides a big change of the shape of the upper extremity. However, the device can not detect the gesture, which provides a small change of the shape of the upper extremity.

SUMMARY

In view of the above-described problem, it is an object of the present disclosure to provide an information input device and an information input method, which provide to reduce a strain of a user when the user wears the device, and are configured to input various types of operation information into an information processing device.

According to a first aspect of the present disclosure, an information input device includes: an applying element having a ring shape so that an finger of a user is inserted into the applying element; a receiving element having a ring shape so that an finger of a user is inserted into the receiving element and disposed adjacent to the applying element in an extending direction of a center line of the applying element; a signal generating element generating and transmitting a waveform signal to the apply element so that the applying element outputs a measurement signal; and a signal extracting element extracting a signal relating to a posture of the finger from a reception signal, which is output from the receiving element based on the measurement signal received by the receiving element.

In the above information input device, since the applying element and the receiving element are attached to the finger, the user easily wear the device. Further, since the cross sectional area and the cross sectional shape of the finger is largely changed, compared with a wrist, a small bending motion and a small stretching motion of the finger as the posture of the finger are distinguishable. Thus, the small change of the posture of the finger is detectable.

According to a second aspect of the present disclosure, a method for inputting information executed by the information input device according to the first aspect, the method includes: extracting a first signal relating to a standard posture of the finger from the reception signal when the finger takes the standard posture, and storing the first signal as a standard signal; extracting a second signal relating to a certain posture of the finger from the reception signal when the finger takes the certain posture; and subtracting the second signal from the first signal, and outputting a subtracted result.

In the above method, if the information operation is output to the information processing device based on only the signal relating to the posture of the finger, which is extracted when the user takes the certain posture, the signal may vary with time because of the influence of the variation of the reception signal over time. Thus, even when the user takes the same posture, the signal may vary over time. In the above method, with using the difference between the signal relating to the posture extracted at the time when the user takes the standard posture of the finger, and the signal extracted at the time when the user takes the certain posture of the finger corresponding to the desired operation information, the operation information is obtained. Thus, the influence on the operation information caused by the variation of over time is restricted.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

Figure 1:
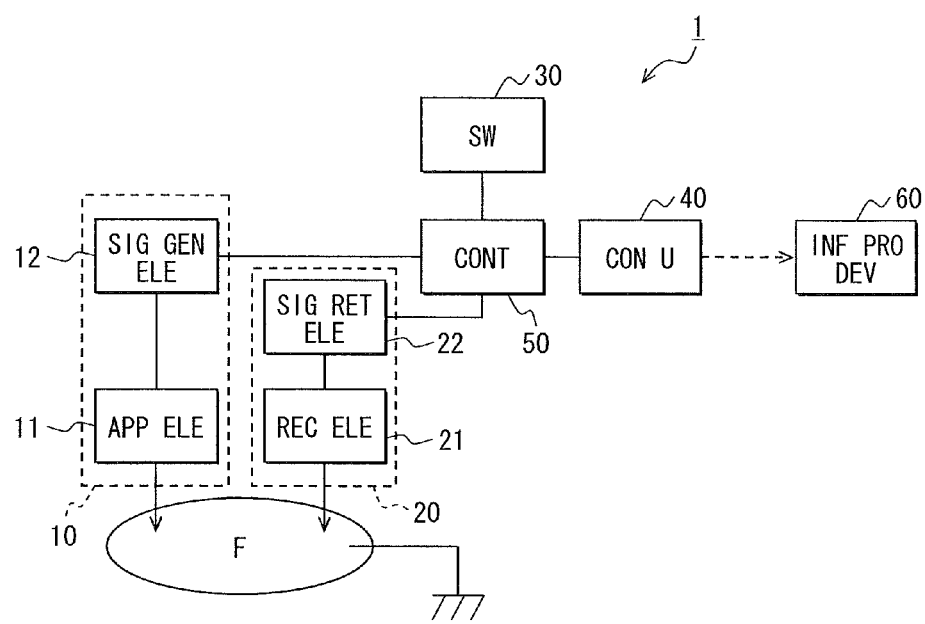
FIG. 1 is a block diagram showing an information input device according to a first embodiment.
Figure 2:
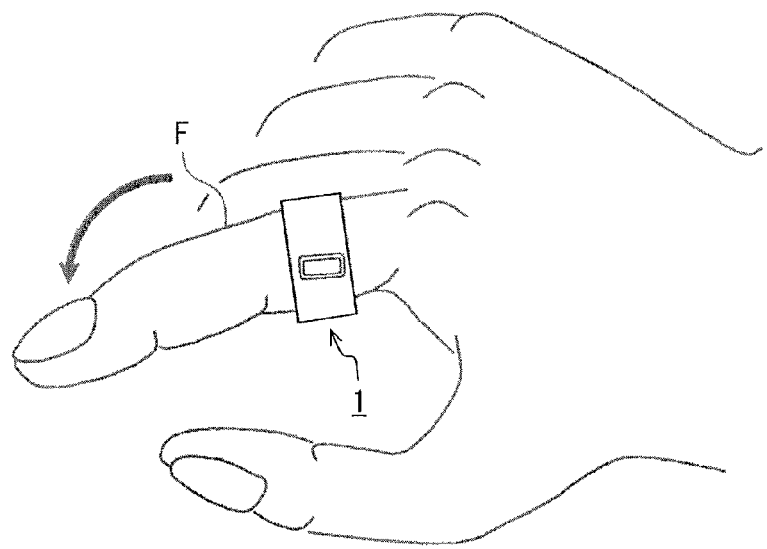
FIG. 2 is a diagram showing the information input device attached to a finger of a user.

An information input device 1 according to a first embodiment will be explained with reference to FIGS. 1 to 5. FIG. 1 shows a block diagram of the information input device 1. FIG. 2 shows a state that the device 1 is attached to a finger F of an operator, i.e., a user.

The information input device 1 is attached to the finger F of the user. The device 1 detects a posture of the finger F such as bending and stretching motion of the finger F so that the device 1 outputs a signal relating to the operation information and the like to an information processing device 60. The information processing device 60 controls, for example, a computer, a vehicle navigation device, a volume adjustment of an audio device, an air blow amount adjustment of an air conditioner and the like. In the present embodiment, the information input device 1 is attached to a first finger (i.e., an index finger).

As shown in FIG. 1, the device 1 includes a signal applying unit 10 for providing a measurement unit, a signal extracting unit 20, a switch 30 as a control unit for inputting a timing at which the posture of the finger F of the user is detected, a communication unit 40 for outputting a signal to an information processing device 60, and a controller 50 for controlling the signal applying unit 10, the signal extracting unit 20 and the communication unit 40 and for generating the signal to be output to the information processing device 60. The information processing device 60 is arranged on an outside of the device 1.

The signal applying unit 10 outputs a measurement signal used for detection of the posture of the finger F. The signal applying unit 10 includes an applying element 11 as an electrode for outputting the measurement signal and a signal generating element 12 for generating a waveform signal, which provides to output the measurement signal from the applying element 11.

Figure 3:
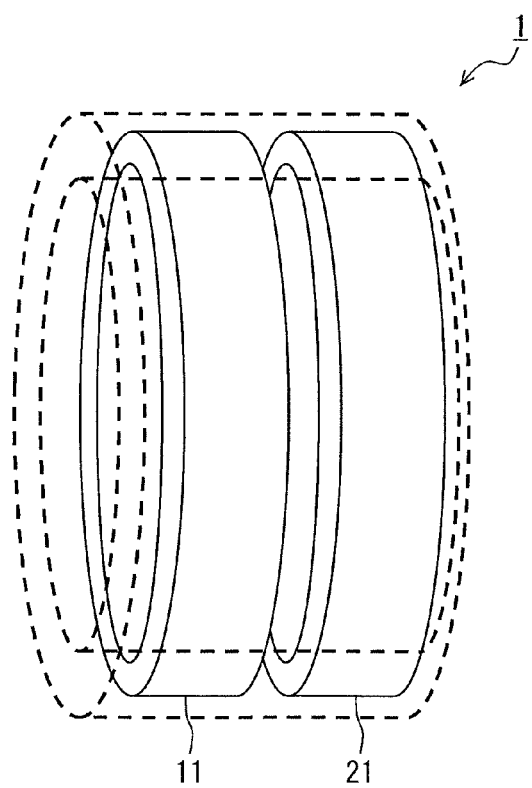
FIG. 3 is a diagram showing an arrangement of an applying element and a receiving element.

FIG. 3 shows an arrangement of the applying element 11 and the receiving element 21.

The applying element 11 is an electrode for applying an electric field as the measurement signal to the finger F of the user when the signal generating element 12 inputs the waveform signal into the applying element 11. The applying element 11 is the electrode having a ring shape so that the finger F is inserted into the applying element 11, as shown in FIG. 3.

The signal generating element 12 generates the waveform signal to be output to the applying element 11 when the signal generating element 12 receives the signal from the controller 50. Specifically, the signal generating element 12 generates an alternating current having a predetermined frequency such as 200 kHz. As long as the signal generating element 12 generates the alternating current having the predetermined frequency, the signal generating element 12 may be any kind of an element.

The signal extracting unit 20 receives the measurement signal, which is output from the signal applying unit 10 and changed in accordance with the posture of the finger F. The signal extracting unit 20 includes the receiving element 21 and the signal extracting element 22. The receiving element 21 receives the measurement signal transmitted from the applying element 11, and generates a reception signal. The signal extracting element 22 extracts the signal relating to the posture of the finger F from the reception signal generated in the receiving element 21.

The receiving element 21 receives the measurement signal, of which the property is changed according to the posture of the finger F, and generates the reception signal provided by an alternating current. Here, the measurement signal to be received by the receiving element 21 is provided by an electric field. As shown in FIG. 3, the receiving element 21 is the electrode having the ring shape so that the finger F is inserted into the receiving element 21. Further, the ring shape of the receiving element 21 and the ring shape of the applying element 11 have the common center axis. The receiving element 21 is disposed adjacent to the applying element 11.

Figure 4:
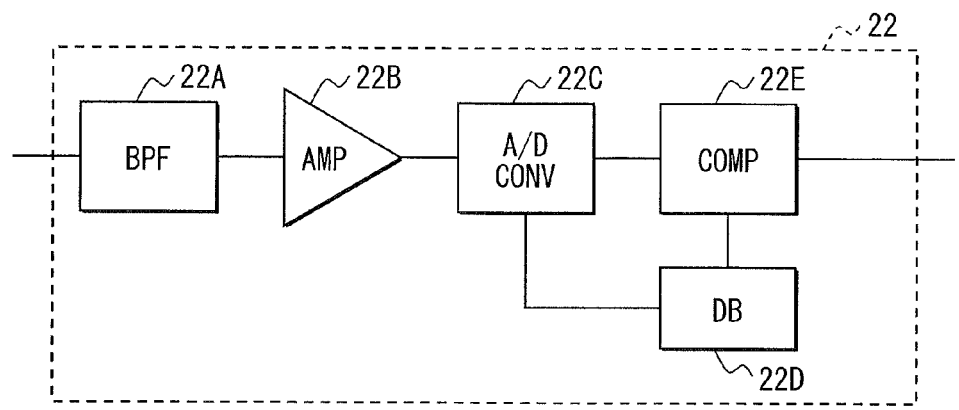
FIG. 4 is a block diagram showing a signal extracting element of the information input device.

FIG. 4 shows a block diagram of the signal extracting element 22.

The signal extracting element 22 executes an amplifying process and a filtering process with respect to the reception signal generated in the receiving element 21. Thus, the signal extracting element 22 extracts the signal relating to the posture of the finger F. As shown in FIG. 4, the signal extracting element 22 includes a band pass filter (i.e., BPF) 22A, an amplifier 22B, an alternating-direct current converter (i.e., A/D converter) 22C, a database (i.e., DB) 22D and a comparator 22E.

The BPF 22A passes only the signal having a certain frequency relating to the posture of the finger F among the reception signal in the receiving element 21. The BPF 22A interrupts the signal having other frequencies such as a noise. The amplifier 22B amplifies the signal relating to the posture of the finger F, which is passed through the BPF 22A, to be a predetermined level.

The A/D converter 22C converts the amplified signal output from the amplifier 22b from the alternating current to a direct current. Specifically, the reception signal generated in the receiving element 21 is the alternating current, and the signal relating to the posture of the finger F passing through the BPF 22A is also the alternating current. The A/D converter 22C converts the alternating current of the signal relating to the posture of the finger F to the direct current.

The signal relating to the posture of the finger F, which is converted to the direct current, is stored in the database 22D. When the comparator 22E requests information to the database 22D, the stored signal relating to the posture of the finger F is read out from the database 22D. The database 22D is a memory such as a hard disk drive, non-volatile memory or the like.

The comparator 22E compares the signal relating to the posture of the finger F, which is currently converted by the A/D converter 22C to the direct current, with the stored signal relating to the posture of the finger F in the database 22D. In the present embodiment, the comparator 22E determines whether the currently converted signal is larger or smaller than the stored signal.

Figure 5:
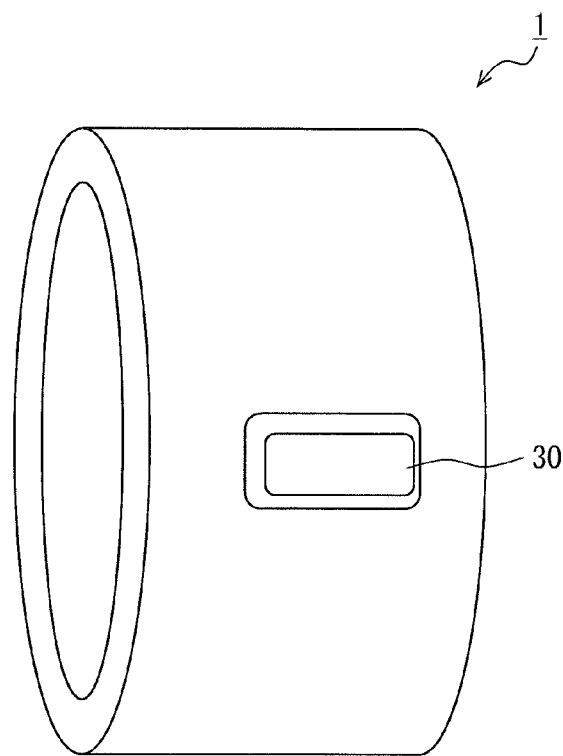
FIG. 5 is a diagram showing an arrangement of a switch in the information input device.

FIG. 5 shows an arrangement position of the switch 30.

The user inputs the timing signal with using the switch 30. The timing signal represents time, at which the posture of the finger F is detected. The switch 30 is a button arranged on an outer surface of the measurement unit, which is provided by the applying element 11 and the receiving element 21. The measurement unit forms the ring shape. When the switch 30 is arranged at a position in FIG. 5, the user pushes the switch 30 with using a thumb. Specifically, the user can input the operation information into the information input device 1 by one hand.

The communication unit 40 converts the signal output from the information input device 1 to the information processing device 60, and the signal input from the information processing device 60 into the information input device 1, so that a converted signal is adapted to a communication system. Further, the communication unit 40 transmits and receives the converted signal as information.

The controller 50 indicates the timing for detecting the posture of the finger F, which is input via the switch 30 by the user. Further, the controller 50 controls the signal applying unit 10 and the signal extracting unit 20 based on the information and the like transmitted from the information processing device 60. The control process of the controller 50 will be explained later.

The input method of the operation information with using the information input device 1 will be explained as follows.

As shown in FIG. 2, the information input device 1 is attached to the finger F similar to a ring. The user bends the finger F to be the posture corresponding to the operation information of the information processing device 60, and further, pushes the switch 30 with the thumb.

The controller 50 receives the signal generated by the switch 30. As shown in FIG. 2, the controller 50 outputs a control signal corresponding to the waveform signal to the signal generating element 12. The signal generating element 12 generates the waveform signal corresponding to the control signal when the control signal is input into the signal generating element 12. Thus, the signal generating element 12 outputs the waveform signal to the applying element 11. When the waveform signal is input into the applying element 11, the applying element 11 applies the measurement signal to the finger F. The receiving element 21 receives the measurement signal, which is changed according to the posture of the finger F, and then, generates the reception signal.

Here, a human body including the finger F is considered as a ground (i.e., earth). Thus, the measurement signal applied to the finger F flows through the human body into the ground. In this case, a human body impedance, an impedance of a contact portion between the applying element 11 and the human body, an impedance of a contact portion between the receiving element 21 and the human body and the like are formed between the applying element 11 and the receiving element 21. Specifically, the impedance of a contact portion between the applying element 11 and the human body, and the impedance of a contact portion between the receiving element 21 and the human body are changed according to an area of the contact portion and an influence of a contact pressure.

Specifically, when the user bends and stretches the finger F, on which the information input device 1 is attached, i.e., when the user performs the bending motion and the stretching motion of the finger F, the shape and a cross sectional area of a knuckle of the finger F are changed. This change causes the change of the area of the contact portion and the contact pressure. The reception signal generated in the receiving element 21 is affected by the influence of the above impedance change.

The BPF 22A of the signal extracting element 22 removes the noise and the like from the reception signal output from the receiving element 21. Thus, the signal extracting element 22 extracts the signal relating to the posture of the finger F. Then, the signal relating to the posture of the finger F is amplified by the amplifier 22B so that the signal intensity reaches a predetermined level. The signal relating to the posture of the finger F as the alternating current signal is converted to the direct current signal by the A/D converter 22C.

The converted signal relating to the posture of the finger F is compared with the stored signal relating to the posture of the finger F in the database 22D with using the comparator 22E. Here, the stored signal relating to the posture of the finger F in the database 22D provides a threshold signal. The stored signal is preliminary stored in the database 22D. The comparator 22E determines whether the converted signal relating to the posture of the finger F is larger or smaller than the stored signal relating to the posture of the finger F in the database 22D.

The comparison result of the comparator 22E is output to the controller 50. The controller 50 generates an on-signal when the converted signal relating to the posture of the finger F is larger than the stored signal relating to the posture of the finger F in the database 22D, and generates an of-signal when the converted signal is smaller than the stored signal. Further, the controller 50 outputs the on-signal and the off-signal to the information processing device 60 via the communication unit 40. The information processing device 60 executes a certain process based on the signal from the controller 50.

In the above information input device 1, the user inserts the finger F into the applying element 11 and the receiving element 21, so that the user wears the information input device 1 on the finger F. Thus, the user easily attached the device 1 to the finger F, compared with a conventional information input device with using the voltage sensor with a cable shape according to JP-A-2008-276664 and a conventional information input device attached to the wrist according to JP-A-2002-358149. Thus, the physical strain and mental strain that are caused by the attachment of information input device 1 are reduced.

When the user bends and stretches the finger F, the cross sectional area and the cross sectional shape of the finger F is largely changed, compared with the wrist. Thus, the states of the bending motion and the stretching motion are easily and accurately detected so that the bending motion is distinguishable from the stretching motion. Specifically, since the relationship between the applying element 11 and the finger F and the relationship between the receiving element 21 and the finger F are largely changed, the change of the posture of the finger F is distinguishably and accurately detected. Thus, the operation information input by the user is accurately input into the information processing device 60. Further, the number of types of the posture of the finger F, which are used for the input of the operation information, increases.

In the above embodiment, the applying element 11 and the receiving element 21 are electrodes, and the change of the measurement signal based on the impedance changes between the applying element 11 and the finger F and between the receiving element 21 and the finger F is detected as the signal relating to the posture of the finger F. Alternatively, the applying element 11 and the receiving element 21 may be coils, and the change of the posture of the finger F is detected according to physical quantity of the coils.

The detection method of the change of the posture of the finger F will be explained as follows. For example, when the applying element 11 is a coil such as a toroidal coil, and the waveform signal is supplied to the applying element 11, an induction current flows on the finger F. Further, when the receiving element 21 is a coil such as a toroidal coil, an electro motive force is generated in the receiving element 21 according to the change of the induction current flowing on the finger F. Thus, the signal relating to the electro motive force is output to the signal extracting element 22. When the posture of the finger F is changed, the relative positional relationship between the finger F and the applying element 11 and the relative positional relationship between the finger F and the receiving element 21 are changed. The intensity of the induction current on the finger F induced by the applying element 11 depends on the distance and the relative position between the applying element 11 and the finger F. The electro motive force in the receiving element 21 caused by the induction current depends on the distance and the relative position between the receiving element 21 and the finger F. Thus, when the posture of the finger F is changed, the signal relating to the electro motive force in the receiving element 21 is changed. Accordingly, when the change of the signal relating to the electro motive force is extracted, the change of the posture of the finger F is detected.

In the above embodiment, the switch 30 is a button. Alternatively, the switch 30 may be a touch switch with using a touch panel, a voice recognition input element, a gesture recognition input element or the like.

Further, a content of the process to be executed by the information processing device 60 according to the signal input from the information input device 1 may be displayed on a display device such as a LED display so that the user recognizes the content. Alternatively, the content may be transmitted to the user in a voice message communication.

Second Embodiment

Figure 6:
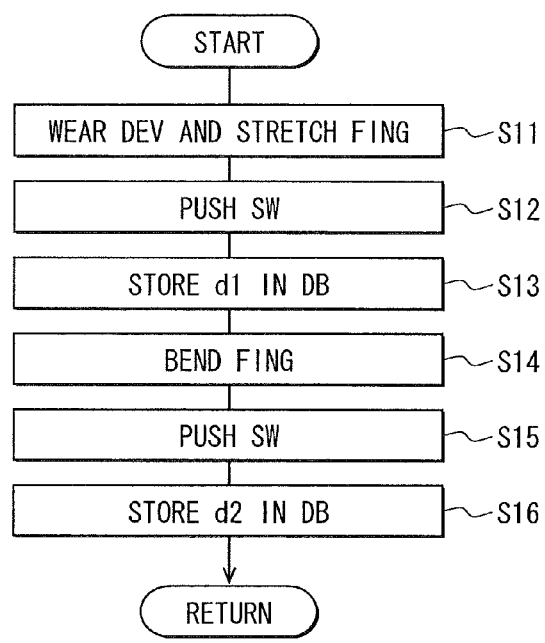
FIG. 6 is a flowchart showing a method for registering a maximum value and a minimum value of a signal in the information input device relating to a posture of the finger, according to a second embodiment.
Figure 7:
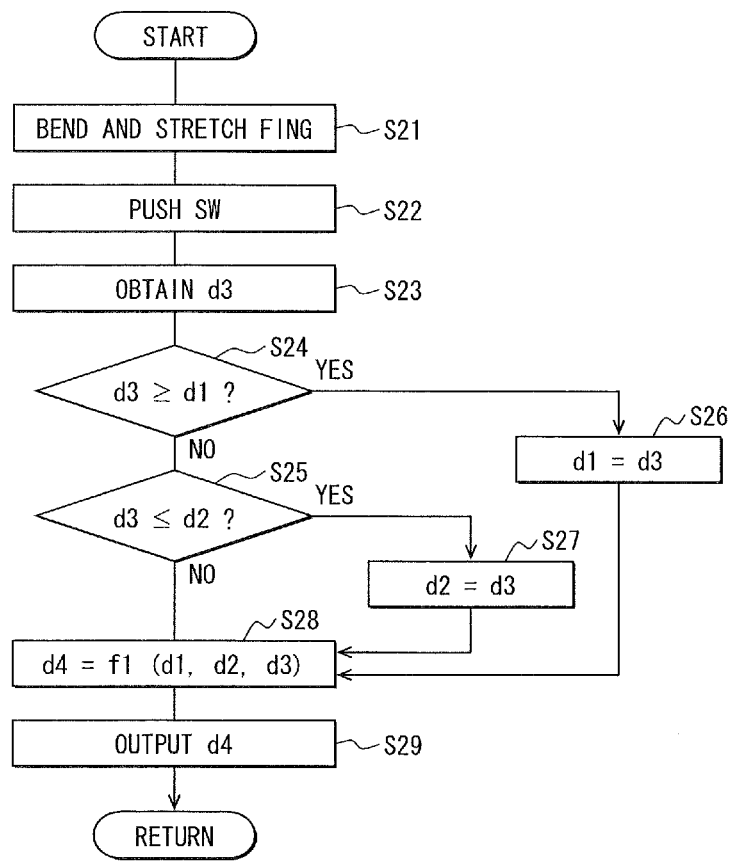
FIG. 7 is a flowchart showing an input method of operation information with using the registered maximum value and the registered minimum value of the signal.

An information input device 1 according to a second embodiment will be explained with reference to FIGS. 6 and 7.

An input method of the operation information according to the second embodiment is different from the first embodiment.

The input method of the operation information in the information input device 1 according to the second embodiment has different features from the first embodiment such that the maximum value and the minimum value of the signal relating to the posture of the finger F are stored and registered in the database 22D, and the signal to be output to the information processing device 60 is corrected with using the maximum value and the minimum value of the signal relating to the posture of the finger F.

A method for registering the maximum value and the minimum value of the signal relating to the posture of the finger F will be explained with reference to FIG. 6. FIG. 6 shows a flowchart of the method for registering the maximum value and the minimum value of the signal relating to the posture of the finger F.

First, the user attaches the information input device 1 to the finger F. In step S11, the user stretches the finger F so that the user takes a first standard posture. Then, in step S12, the user pushes the switch 30 with the thumb.

Then, the controller 50 in the information input device 1 outputs the control signal for applying the measurement signal via the signal applying unit 10. The signal extracting unit 20 receives the measurement signal, which is changed according to the first standard posture of the finger F. Then, the signal extracting unit 20 extracts the signal defined as an input value d1 relating to the first standard posture of the finger F. The input value d1 represents the signal converted by the A/D converter 22C, and is stored in the database 22D in step S13. Step S13 provides the first standard value storing step.

Next, the user bends the finger F so that the user takes the second standard posture in step S14. Then, in step S15, the user pushes the switch 30 with the thumb. Then, the controller 50 in the information input device 1 extracts the signal defined as an input value d2 relating to the second standard posture of the finger F. The input value d2 represents the signal converted by the A/D converter 22C, and is stored in the database 22D in step S16. Step S16 provides the second standard value storing step.

The input value d1 is the maximum value of the signal relating to the posture of the finger F. The input value d2 is the minimum value of the signal relating to the posture of the finger F. Accordingly, the operation range of the information input device 1 is registered.

When the maximum value and the minimum value of the signal relating to the posture of the finger F are registered, the operation information to be output to the information processing device 60 is input into the information input device 1. FIG. 7 shows a flowchart of the input method of the operation information with using the registered maximum value and the registered minimum value of the signal relating to the posture of the finger F.

In step S21, the user bends the finger F to correspond to desired operation information. Under a condition that the user bends the finger F, the user pushes the switch 30 with the thumb in step S22. Then, the controller 50 outputs the control signal for applying the measurement signal via the signal applying unit 10. The signal extracting unit 20 receives the measurement signal, which is changed by the posture of the finger F. Further, in step S23, the signal extracting unit 20 extracts and obtains a signal defined as an input value d3 and relating to the posture of the finger F, which corresponds to the desired operation information. The input value d3 represents the signal converted by the A/D converter 22C.

Next, it is determined whether the input value d3 is in the operation range of the information input device 1.

Specifically, the comparator 22E compares the input value d3 with the input value d1 stored in the database 22D in step S24. When the input value d3 is smaller than the input value d1, the comparator 22E compares the input value d3 with the input value d2 stored in the database 22D in step S25. When the input value d3 is larger than the input value d2, it goes to step S28. In step S28, the signal to be output to the information processing device 60 is calculated.

When the input value d3 is equal to or larger than the input value d1 in step S24, it goes to step S26. In step S26, the input value d1 is updated to the input value d3, and then, the updated input value d1 is registered again. Then, it goes to step S28, and the signal to be output to the information processing device 60 is calculated. When the input value d3 is equal to or smaller than the input value d2 in step S25, it goes to step S27. In step S27, the input value d2 is updated to the input value d3, and then, the updated input value d2 is registered again. Then, it goes to step S28, and the signal to be output to the information processing device 60 is calculated. Thus, in steps S26 and S27, the operation range of the information input device 1 is updated, i.e., changed.

Then, with using the stored input values d1, d2 in the database 22D and the current input value d3, an output value d4 to be output to the information processing device 60 is calculated according to the following equation F1 in step S28. Step S28 provides an output calculation step.

$$d4 = (d3-d1)/(d2-d1) \quad \text{F1}$$

The above calculation may be performed by a calculation element in the controller 50. Alternatively, the calculation may be performed by another calculation element. Thus, the calculated output value d4 is output to the information processing device 60 via the communication unit 40 in step S29.

In the above method, the output value d4 output from the information input device 1 is corrected by the input values d1, d2. Thus, compared with a case where the output value is not corrected, the variation of the output value d4 is small. Accordingly, the information processing device 60 accurately recognizes the operation information corresponding to the output value d4. The error operation of the information processing device 60 is restricted.

Further, since the connection between the change of the posture of the finger F and the output value d4 is clarified, the number of types of the posture of the finger F, which are used for the operation information, increases, and the number of operation information items, which is capable of inputting into the information processing device 60, increases.

Further, the timing of extracting the signal relating to the posture of the finger F is controlled, so that the signal extracting unit 20 extracts only the signal relating to the posture of the finger F at time when the user intends to input the operation information with respect to the information processing device 60. Specifically, the posture of the finger F at time other than the extracting time is not detected. That is, the signal relating to the posture of the finger F at time when the user does not intend to input the operation information with respect to the information processing device 60 is not extracted. Accordingly, the unintentional operation of the information processing device 60 is restricted.

Third Embodiment

An information input device 1 according to a third embodiment will be explained as follows.

An input method of the operation information according to the third embodiment is different from the first embodiment. The input method according to the third embodiment will be explained with reference to FIG. 8.

The input method of the operation information in the information input device 1 according to the third embodiment has different features from the first embodiment such that the user pushes the switch 30 at the starting time of the input operation and at the ending time of the input operation, and the output value d4 is calculated based on an input value d31 representing the signal relating to the posture of the finger F extracted at the starting time and an input value d32 representing the signal relating to the posture of the finger f extracted at the ending time.

Figure 8:
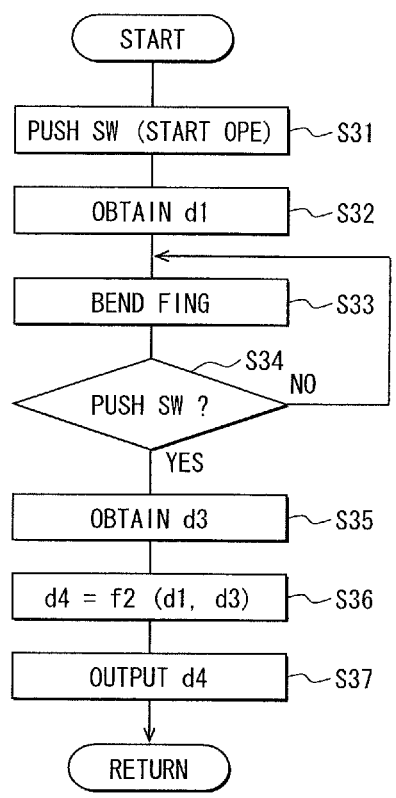
FIG. 8 is a flowchart showing a method for obtaining an input value of the information input device, according to a third embodiment.

Here, a method for extracting and obtaining the signal relating to the posture of the finger F at the starting time and the ending time of the operation will be explained with reference to FIG. 8. FIG. 8 shows a flowchart of the method for extracting and obtaining the input value representing the signal relating to the posture of the finger F at the starting time and the ending time of the operation.

First, in step S31, the user pushes the switch 30 of the information input device 1 with the thumb when the user attaches the device 1 to the finger F. The controller 50 of the information input device 1 outputs the control signal for applying the measurement signal via the signal applying unit 10. The signal extracting unit 20 receives the measurement signal, which is changed according to the standard posture of the finger F at the time when the user pushes the switch 30. Further, the signal extracting unit 20 extracts the signal defined as the input value d1 relating to the standard posture of the finger F. The input value d1 is the signal converted by the A/D converter 22C. Then, in step S32, the input value d1 is stored in the database 22D. Step S32 provides the standard posture storing step.

Next, in step S33, the user bends the finger F to correspond to a desired operation information. Then, in step S34, the user pushes the switch 30 with the thumb again. In step S34, the controller 50 determines whether the user pushes the switch 30. When the controller 50 determines that the user pushes the switch 30, it goes to step S35. When the controller 50 determines that the user does not push the switch 30, it returns to step S33. In this case, the determination in the controller 50 is repeatedly executed until the user bends the finger F to be a certain posture, and the user pushes the switch 30.

When the controller 50 determines that the user pushes the switch 30, the controller 50 outputs the control signal for applying the measurement signal via the signal applying unit 10. The signal extracting unit 20 receives the measurement signal, which is changed according to the certain posture of the finger F (which corresponds to the desired operation information) at time when the user pushes the switch 30. In step S35, the signal extracting unit 20 extracts and obtains the signal defined as d3 relating to the certain posture of the finger F. Step S35 provides the extracting step.

Then, based on the input value d3, the input value d1 stored in the database 22D, and the following equation F2, the output value d4 to be output to the information processing device 60 is calculated. Step S36 provides an output value calculation step.

$$d4 = A(d3-d1) \quad \text{F2}$$

Here, A represents a predetermined constant value.

In step S37, the calculated output value d4 is transmitted to the information processing device 60 via the communication unit 40.

In the above construction, with using the difference between the input value d1 extracted at the time when the user takes the standard posture of the finger F, and the input value d3 extracted at the time when the user takes the certain posture of the finger F corresponding to the desired operation information, the output value d4 is obtained. Thus, the influence on the output value d4 caused by the variation of over time with regard to a reception sensitivity of the receiving element 21 is restricted. Further, compared with the second embodiment, it is not necessary to obtain the input value d2. Accordingly, the input process of the operation information is simplified. The user easily performs the input process.

Fourth Embodiment

Figure 9:
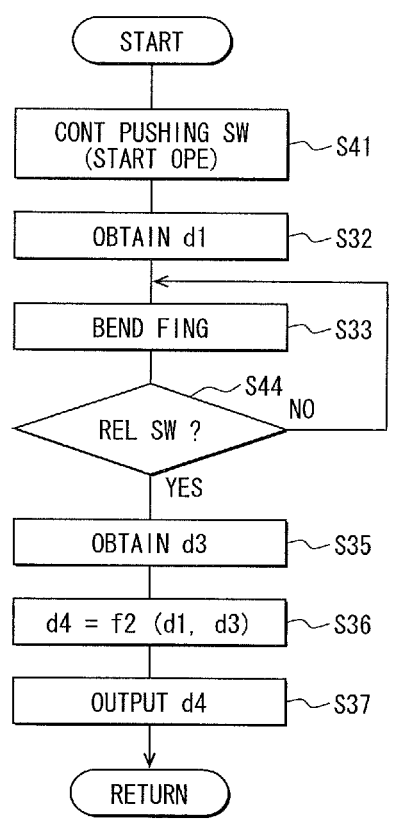
FIG. 9 is a flowchart showing a method for obtaining an input value as a signal relating to a posture of the finger in the information input device, according to a fourth embodiment.

An information input device 1 according to a fourth embodiment will be explained as follows with reference to FIG. 9.

An input method of the operation information according to the fourth embodiment is different from the third embodiment. The input method according to the fourth embodiment will be explained with reference to FIG. 9.

The input method of the operation information in the information input device 1 according to the fourth embodiment has different features from the third embodiment such that the user continues pushing the switch 30 from the starting time of the operation to the ending time of the operation.

Here, the user continues pushing the switch 30 from the starting time of the operation to the ending time of the operation, and the signal relating to the posture of the finger F at time when the user starts to push the switch 30 and the signal relating to the posture of the finger F at time when the user stops pushing the switch 30 are extracted. FIG. 9 shows a flowchart of a method for extracting the signal relating to the posture of the finger F at time when the user starts to push the switch 30 and the signal relating to the posture of the finger F at time when the user stops pushing the switch 30.

First, in step S41, the user pushes the switch 30 of the information input device 1 with the thumb when the user attaches the device 1 to the finger F. Further, the user maintains to push the switch 30. The controller 50 of the information input device 1 outputs the control signal for applying the measurement signal via the signal applying unit 10. The signal extracting unit 20 receives the measurement signal, which is changed according to the standard posture of the finger F at the time when the user pushes the switch 30. Further, the signal extracting unit 20 extracts the signal defined as the input value d1 relating to the standard posture of the finger F. The input value d1 is the signal converted by the A/D converter 22C. Then, in step S32, the input value d1 is stored in the database 22D. Step S32 provides the standard posture storing step.

Next, in step S33, the user bends the finger F to correspond to desired operation information. Then, the user stops pushing the switch 30, so that the user releases the thumb from the switch 30. Thus, the user ends to push the switch 30. In step S44, the controller 50 determines whether the user releases the thumb from the switch 30, i.e., whether the user ends to push the switch 30. When the controller 50 determines that the user pushes the switch 30, it goes to step S35. When the controller 50 determines that the user ends to push the switch 30, it goes to step S35. When the controller 50 determines that the user continues to push the switch 30, it returns to step S33. In this case, the determination in the controller 50 is repeatedly executed until the user bends the finger F to be a certain posture, and the user ends to push the switch 30.

When the controller 50 determines that the user ends to push the switch 30, the controller 50 outputs the control signal for applying the measurement signal via the signal applying unit 10. The signal extracting unit 20 receives the measurement signal, which is changed according to the certain posture of the finger F (which corresponds to the desired operation information) at time when the user ends to push the switch 30. In step S35, the signal extracting unit 20 extracts and obtains the signal defined as d3 relating to the certain posture of the finger F. Step S35 provides the extracting step.

Then, based on the input value d3, the input value d1 stored in the database 22D, and the above equation F2, the output value d4 to be output to the information processing device 60 is calculated. Step S36 provides an output value calculation step. In step S37, the calculated output value d4 is transmitted to the information processing device 60 via the communication unit 40.

In the above construction, when the user continues to push the switch 30 for a predetermined time interval, the input value d1 is obtained at the time when the user starts to push the switch 30, and the input value d3 is obtained at the time when the user ends to push the switch 30. Thus, when the input values d1, d3 are obtained, the input error of the signals is restricted, compared with a case where the input values d1, d3 are obtained at each time when the user pushes the switch 30.

Fifth Embodiment

Figure 10:
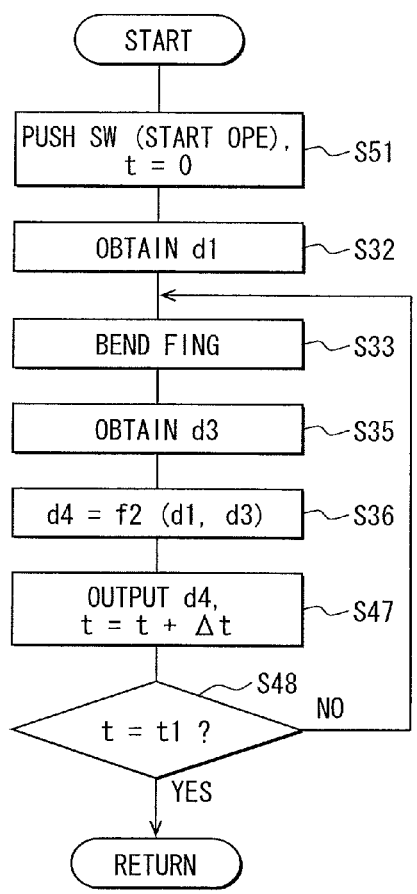
FIG. 10 is a flowchart showing a method for obtaining an input value as a signal relating to a posture of the finger in the information input device, according to a fifth embodiment.

An information input device 1 according to a fifth embodiment will be explained as follows with reference to FIG. 10.

An input method of the operation information according to the fifth embodiment is different from the third embodiment. The input method according to the fifth embodiment will be explained with reference to FIG. 10.

The input method of the operation information in the information input device 1 according to the fifth embodiment has different features from the third embodiment such that the user can operate the device 1 within only a predetermined time period from time when the user pushes the switch 30.

The input value d1 is obtained at time when the user pushes the switch 30. Then, the input value d3 is obtained within a predetermined time period. This input method will be explained with reference to FIG. 10. FIG. 10 is a flowchart of the method for extracting and obtaining the input value d3 within a predetermined time period from time when the user pushes the switch 30.

First, in step S51, the user pushes the switch 30 of the information input device 1 with the thumb when the user attaches the device 1 to the finger F. Further, the controller 50 sets the time of the timer to be zero (i.e., t=0) when the user pushes the switch 30, and the operation start signal is input into the controller 50. The controller 50 of the information input device 1 outputs the control signal for applying the measurement signal via the signal applying unit 10. The signal extracting unit 20 receives the measurement signal, which is changed according to the standard posture of the finger F at the time when the user pushes the switch 30. Further, the signal extracting unit 20 extracts the signal defined as the input value d1 relating to the standard posture of the finger F. The input value d1 is the signal converted by the A/D converter 22C. Then, in step S32, the input value d1 is stored in the database 22D. Step S32 provides the standard posture storing step.

Then, in step S33, the user bends the finger F to correspond to desired operation information. Then, the controller 50 outputs the control signal for applying the measurement signal via the signal applying unit 10. The signal extracting unit 20 receives the measurement signal, which is changed according to the certain posture of the finger F (which corresponds to the desired operation information). In step S35, the signal extracting unit 20 extracts and obtains the signal defined as d3 relating to the certain posture of the finger F. Step S35 provides the extracting step.

Then, based on the input value d3, the input value d1 stored in the database 22D, and the above equation F2, the output value d4 to be output to the information processing device 60 is calculated. Step S36 provides an output value calculation step. In step S47, the calculated output value d4 is transmitted to the information processing device 60 via the communication unit 40. Further, in step S47, the controller 50 adds an increment Δt to the time of the timer (i.e., t=t+Δt).

Then, in step S48, the time t of the timer is compared with a predetermined time t1. When the time t of the timer is equal to the predetermined time t1, the input operation of the operation information with using the information input device 1 ends. Then, the information processing device 60 is controlled, for example, according to the output value d4, which is finally input into the device 60. When the time t of the timer is not equal to the predetermined time t1, it returns to step S33. Then, steps S33 to S47 are repeated.

In the above construction, when the user pushes the switch 30 once, the input values d1, d3 are obtained. Thus, the input operation of the operation information is easily performed, compared with a method for obtaining each input value d1, d3 by pushing the switch 30 and a method for obtaining the input values d1, d3 by continuing to push the switch 30.

Sixth Embodiment

Figure 11:
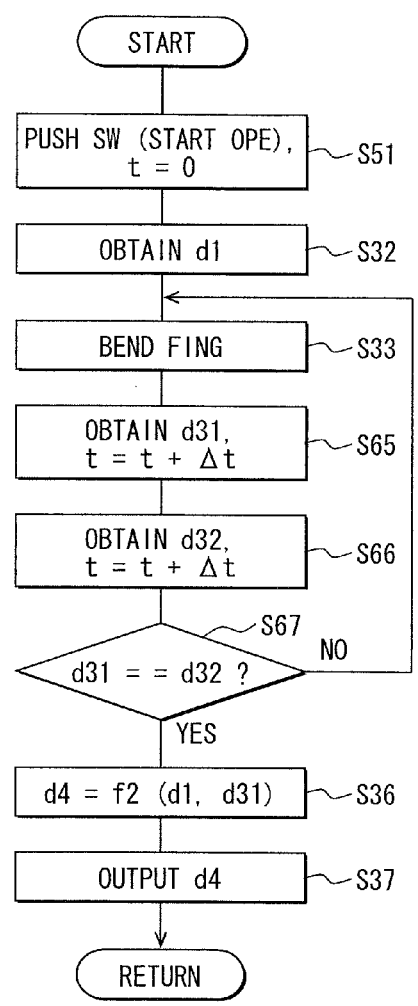
FIG. 11 is a flowchart showing a method for obtaining an input value as a signal relating to a posture of the finger in the information input device, according to a sixth embodiment.

An information input device 1 according to a sixth embodiment will be explained as follows with reference to FIG. 11.

An input method of the operation information according to the sixth embodiment is different from the first embodiment. The input method according to the sixth embodiment will be explained with reference to FIG. 11.

The input method of the operation information in the information input device 1 according to the sixth embodiment has different features from the fifth embodiment such that when the user continues to take the same posture of the finger F during a predetermined time period from time when the user pushes the switch 30, the signal relating to the posture is used as the input value for calculating the output value d4.

Here, the input value d1 is obtained at time when the user pushes the switch 30, and the input value d31 is obtained when the user continues to take the same posture during the predetermined time period since the user pushes the switch 30. This input method will be explained with reference to FIG. 11. FIG. 11 is a flowchart of the method for extracting and obtaining the input value d31 when the user continues to take the same posture of the finger F during the predetermined time period since the user pushes the switch 30.

First, in step S51, the user pushes the switch 30 of the information input device 1 with the thumb when the user attaches the device 1 to the finger F. Further, the controller 50 sets the time of the timer to be zero (i.e., t=0) when the user pushes the switch 30, and the operation start signal is input into the controller 50. The controller 50 of the information input device 1 outputs the control signal for applying the measurement signal via the signal applying unit 10. The signal extracting unit 20 receives the measurement signal, which is changed according to the standard posture of the finger F at the time when the user pushes the switch 30. Further, the signal extracting unit 20 extracts the signal defined as the input value d1 relating to the standard posture of the finger F. The input value d1 is the signal converted by the A/D converter 22C. Then, in step S32, the input value d1 is stored in the database 22D. Step S32 provides the standard posture storing step.

Then, in step S33, the user bends the finger F to correspond to desired operation information. Then, the controller 50 outputs the control signal for applying the measurement signal via the signal applying unit 10. The signal extracting unit 20 receives the measurement signal, which is changed according to the certain posture of the finger F (which corresponds to the desired operation information). In step S65, the signal extracting unit 20 extracts and obtains the signal defined as d31 relating to the certain posture of the finger F. Step S65 provides the extracting step. Further, in step S65, the controller 50 adds an increment Δt to the time of the timer (i.e., t=t+Δt).

Further, the controller 50 outputs the control signal for applying the measurement signal via the signal applying unit 10 after a predetermined time has past. The signal extracting unit 20 receives the measurement signal, which is changed according to the certain posture of the finger F (which corresponds to the desired operation information), after the predetermined time has passed. In step S66, the signal extracting unit 20 extracts and obtains the signal defined as d32 relating to the certain posture of the finger F. Step S66 provides the extracting step. Further, in step S66, the controller 50 adds an increment Δt to the time of the timer (i.e., t=t+Δt).

Then, in step S67, it is determined whether the input value d31 is equal to the input value d32, which is obtained after the predetermined time has passed. When the input value d31 is not equal to the input value d32, it returns to step S33. In this case, steps S33 to S67 are repeated.

When the input value d31 is equal to the input value d32, it goes to step S36. In step S36, based on the input value d31 or d32, the input value d1, and the above equation F2, the output value d4 to be output to the information processing device 60 is calculated. Step S36 provides an output value calculation step. In step S37, the calculated output value d4 is transmitted to the information processing device 60 via the communication unit 40.

In the above construction, when the user maintains the same posture of the finger F during the predetermined time period such as a few seconds, the input value d31 and the input value d32 are determined. Accordingly, compared with the fifth embodiment, the user easily input the desired operation information, and therefore, the control of the information processing device 60 is easily performed.

Seventh Embodiment

Figure 12:
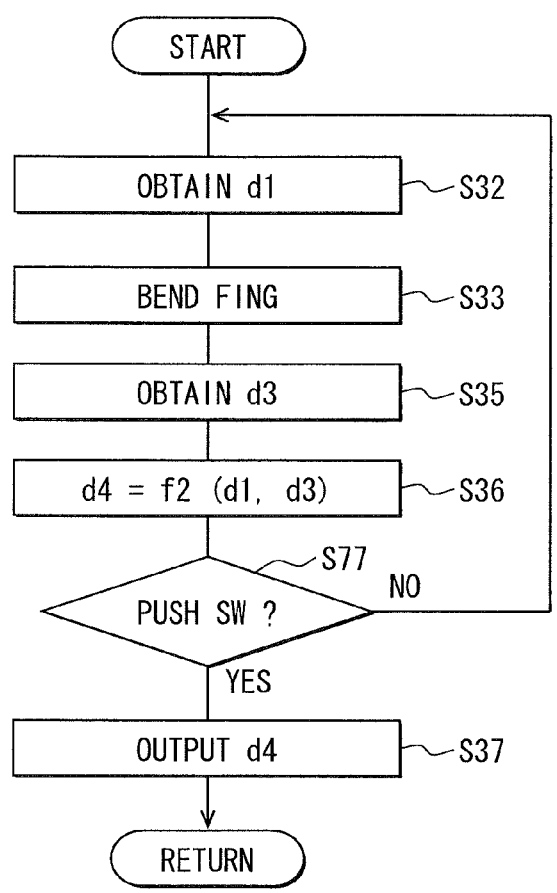
FIG. 12 is a flowchart showing a method for pushing a switch when an output value of the information input device is output to the information processing device, according to a seventh embodiment.

An information input device 1 according to a seventh embodiment will be explained as follows with reference to FIG. 12.

An input method of the operation information according to the seventh embodiment is different from the third embodiment. The input method according to the seventh embodiment will be explained with reference to FIG. 12.

The input method of the operation information in the information input device 1 according to the seventh embodiment has different features from the third embodiment such that the input values d1, d2 are obtained at a predetermined sampling time interval, and when the user pushes the switch 30, the output value d4 calculated just before the user pushes the switch 30 is output to the information processing device 60.

Here, the input values d1, d2 are obtained at the predetermined sampling time interval, and when the user pushes the switch 30, the output value d4 calculated just before pushing the switch 30 is output to the information processing device 60. This input method will be explained with reference to FIG. 12. FIG. 12 is a flowchart of the method for pushing the switch 30 just before the output value d4 is output to the information processing device 60.

First, in step S32, the controller 50 of the information input device 1 outputs the control signal for applying the measurement signal via the signal applying unit 10. The signal extracting unit 20 receives the measurement signal, which is changed according to the standard posture of the finger F at the time when the user pushes the switch 30. Further, the signal extracting unit 20 extracts the signal defined as the input value d1 relating to the standard posture of the finger F. The input value d1 is the signal converted by the A/D converter 22C. Then, in step S32, the input value d1 is stored in the database 22D. Step S32 provides the standard posture storing step.

Next, in step S33, the user bends the finger F to correspond to desired operation information. After the input value d1 is extracted, the predetermined sampling time interval has passed, the controller 50 of the information input device 1 outputs the control signal for applying the measurement signal via the signal applying unit 10. The signal extracting unit 20 receives the measurement signal, which is changed according to the certain posture of the finger F (which corresponds to the desired operation information). Further, the signal extracting unit 20 extracts the signal defined as the input value d3 relating to the certain posture of the finger F. Step S35 provides the extracting step.

When the input value d3 is extracted and obtained, based on the input value d3, the input value d1 stored in the database 22D, and the above equation F2, the output value d4 to be output to the information processing device 60 is calculated. Step S36 provides an output value calculation step.

In step S77, it is determined whether the user pushes the switch 30. When the user does not push the switch 30, it returns to step S32. Then, steps S32 to S77 are repeated. In this case, the output value d4 obtained in step S36 is newly updated at every repeating process.

When the user pushes the switch 30, i.e., when the signal generated by pushing the switch 30 is input into the controller 50, the calculated output value d4 is transmitted to the information processing device 60 via the communication unit 40 in step S37.

The input values d1, d3 are obtained at the predetermined sampling time interval, and the user pushes the switch 30 just before the output value d4 is output. The operation load of the user is reduced. Further, the construction of the information input device 1 is simplified.

The above disclosure has the following aspects.

According to a first aspect of the present disclosure, an information input device includes: an applying element having a ring shape so that an finger of a user is inserted into the applying element; a receiving element having a ring shape so that an finger of a user is inserted into the receiving element and disposed adjacent to the applying element in an extending direction of a center line of the applying element; a signal generating element generating and transmitting a waveform signal to the apply element so that the applying element outputs a measurement signal; and a signal extracting element extracting a signal relating to a posture of the finger from a reception signal, which is output from the receiving element based on the measurement signal received by the receiving element.

In the above information input device, since the applying element and the receiving element are attached to the finger, the user easily wear the device. Further, since the cross sectional area and the cross sectional shape of the finger is largely changed, compared with a wrist, a small bending motion and a small stretching motion of the finger as the posture of the finger are distinguishable. Thus, the small change of the posture of the finger is detectable.

Alternatively, the signal extracted by the signal extracting element may include information about at least one of an impedance between the applying element and the finger inserted into the applying element and an impedance between the receiving element and the finger inserted into the receiving element. The above impedances change with the contact pressure between the applying element and the finger and the contact pressure between the receiving element and the finger. Thus, when the posture of the finger changes, the contact pressure between the applying element and the finger and the contact pressure between the receiving element and the finger also change. When the impedances are detected, the posture of the finger is detected. Here, the impedances change with the electro static capacitance between the applying element and the finger and the electro static capacitance between the receiving element and the finger. When the posture of the finger changes, the electro static capacitance between the applying element and the finger and the electro static capacitance between the receiving element and the finger change. Accordingly, when the impedances are detected, the posture of the finger is detected.

Alternatively, the applying element and the receiving element may be coils, respectively. The signal generating element transmits the waveform signal to the applying element so that the applying element induces an induction current on the finger inserted into the applying element. The reception signal of the receiving element is an electro motive force signal, which is generated in the receiving element according to the induction current, and the signal extracting element extracts the signal relating to the posture of the finger from the electro motive force signal. When the posture of the finger changes, the relative positional relationship between the applying element and the finger and the relative positional relationship between the receiving element and the finger change. The intensity of the induction current induced on the finger with using the applying element changes with the distance and the relative positional relationship between the applying element and the finger. The electro motive force generated in the receiving element by the induction current on the finger changes with the distance and the relative positional relationship between the receiving element and the finger. Thus, when the posture of the finger changes, the signal relating to the electro motive force in the receiving element also changes. Accordingly, when the signal relating to the electro motive force is extracted, the posture of the finger is detected.

Alternatively, the information input device may further include: a controller controlling at least one of the signal generating element to generate the waveform signal and the signal extracting element to extract the signal relating to the posture of the finger from the reception signal. In this case, even when the posture of the finger changes continuously, the posture of the finger is detected at a predetermined time with using the controller. For example, if the timing for detecting the posture of the finger is not controller, and the posture of the finger changes continuously, it is difficult to set the operation information to be input into the information processing device to be a predetermined value. Thus, the timing of detecting the posture of the finger is controlled, so that the posture of the finger is detected even when the posture changes continuously. Further, based on the posture change, the operation information is determined.

Alternatively, the information input device may further include: a switch defining at least one of a timing of generating the waveform signal and a timing of extracting the signal relating to the posture of the finger.

Alternatively, the information input device may further include: a communicating unit outputting information to an information processing device, the information corresponding to the signal relating to the posture of the finger.

According to a second aspect of the present disclosure, a method for inputting information executed by the information input device according to the first aspect, the method includes: extracting a first signal relating to a standard posture of the finger from the reception signal when the finger takes the standard posture, and storing the first signal as a standard signal; extracting a second signal relating to a certain posture of the finger from the reception signal when the finger takes the certain posture; and subtracting the second signal from the first signal, and outputting a subtracted result.

In the above method, if the information operation is output to the information processing device based on only the signal relating to the posture of the finger, which is extracted when the user takes the certain posture, the signal may vary with time because of the influence of the variation of the reception signal over time. Thus, even when the user takes the same posture, the signal may vary over time. In the above method, with using the difference between the signal relating to the posture extracted at the time when the user takes the standard posture of the finger, and the signal extracted at the time when the user takes the certain posture of the finger corresponding to the desired operation information, the operation information is obtained. Thus, the influence on the operation information caused by the variation of over time is restricted.

Alternatively, the method may further include: controlling at least one of generation of the waveform signal by the signal generating element and extraction of one of the first signal and the second signal so that extraction timing of at least one of the first signal and the second signal is controlled. Specifically, the posture of the finger at time other than the extracting timing is not recognized, i.e., detected. Here, the posture of the finger at the extracting timing represents the posture when the user intentionally inputs the operation information into the information processing device. The posture of the finger at time other than the extracting timing represents the posture when the user unintentionally inputs the operation information into the information processing device. Thus, in this case, the reception signal extracted at the time other than the extracting timing does not relate to the operation information.

Alternatively, the extraction of at least one of the first signal and the second signal may be performed by an instruction of the user. In this case, the posture of the finger corresponding to the desired operation information to be input into the information processing device is accurately detected.

Alternatively, the extraction of the first signal may be repeatedly performed at predetermined time intervals, and the extraction of the second signal is performed by an instruction of the user. In this case, the first signal relating to the posture of the finger is extracted without instruction of the user. Thus, the operation load of the user is reduced.

Alternatively, the extracting of the first signal may include: extracting a first standard signal relating to a first standard posture of the finger when the finger takes the first standard posture, and storing the first standard signal; and extracting a second standard signal relating to a second standard posture of the finger when the finger takes the second standard posture, and storing the second standard signal. The subtracting of the second signal from the first signal includes: subtracting the first standard signal from the second signal; subtracting the first standard signal from the second standard signal; and dividing a subtracted second signal by a subtracted second standard signal. The subtracted result is a divided result in the dividing of the subtracted second signal. In this case, the signal to be output from the information input device is always corrected, so that the misidentification of the signal input into the information processing device is restricted.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A method for inputting information executed by the information input device comprising:
    an applying element being a coil and having a ring shape so that a finger of a user is inserted into the applying element;
    a receiving element being a coil and having a ring shape so that a finger of a user is inserted into the receiving element and disposed adjacent to the applying element in an extending direction of a center line of the applying element;
    a signal generating element generating and transmitting a waveform signal to the applying element so that the applying element induces an induction current corresponding to a measurement signal on the finger inserted into the applying element; and
    a signal extracting element extracting a signal relating to a bending and stretching posture of the finger from a signal relating to an electro motive force as a reception signal, which is output from the receiving element based on the induction current,
    the method comprising:
    a standard storing step of extracting a first signal relating to the bending and stretching posture of the finger from the reception signal with the signal extracting element when the finger inserted into the applying element and the reception element takes a standard posture, and storing the first signal relating to the bending and stretching posture of the finger as a standard signal;
    an extracting step of extracting a second signal relating to the bending and stretching posture of the finger from the reception signal when the finger takes a certain bending and stretching posture; and
    an output calculation step of subtracting the second signal relating to the bending and stretching posture of the finger extracted at the extracting step from the first signal relating to the bending and stretching posture of the finger stored at the standard storing step, and outputting a subtracted result.

2. The method according to claim 1, further comprising:
    controlling at least one of generation of the waveform signal by the signal generating element and extraction of one of the first signal and the second signal relating to the bending and stretching posture of the finger by the signal extracting element so that extraction timing of at least one of the first signal in the standard storing step and the second signal in the extracting step relating to the bending and stretching posture of the finger is controlled.

3. The method according to claim 2,
    wherein the extraction of at least one of the first signal in the standard storing step and the second signal in the extracting step relating to the bending and stretching posture of the finger is performed by an instruction of the user.

4. The method according to claim 2,
    wherein the extraction of the first signal relating to the bending and stretching posture of the finger in the standard storing step is repeatedly performed at predetermined time intervals, and wherein the extraction of the second signal relating to the bending and stretching posture of the finger in the extracting step is performed by an instruction of the user.

5. The method according to claim 1,
wherein the standard storing step includes:
a first standard storing step of extracting a first standard signal relating to a first standard bending and stretching posture of the finger when the finger takes the first standard bending and stretching posture, and storing an extracted first standard signal relating to the first standard bending and stretching posture of the finger; and
a second standard storing step of extracting a second standard signal relating to a second standard bending and stretching posture of the finger when the finger takes the second standard bending and stretching posture, and storing an extracted second standard signal relating to the second standard bending and stretching posture of the finger,
wherein the output calculation step includes:
subtracting the first standard signal relating to the first standard bending and stretching posture of the finger and stored in first standard storing step from the second signal relating to the bending and stretching posture of the finger and extracted in the extracting step;
subtracting the first standard signal relating to the first standard bending and stretching posture of the finger and stored in first standard storing step from the second standard signal relating to the second standard bending and stretching posture of the finger and stored in second standard storing step;
dividing a subtracted second signal by a subtracted second standard signal; and
outputting a divided result.

6. A method for inputting information executed by the information input device comprising:
an applying element being a coil and having a ring shape so that a finger of a user is inserted into the applying element;
a receiving element being a coil and having a ring shape so that a finger of a user is inserted into the receiving element and disposed adjacent to the applying element in an extending direction of a center line of the applying element;
a signal generating element generating and transmitting a waveform signal to the applying element so that the applying element induces an induction current corresponding to a measurement signal on the finger inserted into the applying element; and
a signal extracting element extracting a signal relating to a bending and stretching posture of the finger from a signal relating to an electro motive force as a reception signal, which is output from the receiving element based on the induction current,
the method comprising:
extracting a first signal relating to the bending and stretching posture of the finger from the reception signal with the signal extracting element when the finger inserted into the applying element and the reception element takes a first posture;
storing the first signal after the first signal is extracted;
extracting a second signal relating to the bending and stretching posture of the finger from the reception signal when the finger takes a second posture;
subtracting the second signal from the stored first signal to generate a subtracted result; and
outputting the subtracted result.

7. The method according to claim 6,
wherein at least one of the extracting of the first signal and the extracting of the second signal is performed by the user activating an element on the information input device.

8. The method according to claim 6,
wherein the extracting of the first signal is repeatedly performed at predetermined time intervals, and
wherein the extracting of the second signal is performed by an instruction of the user.

* * * * *